April 17, 1956 — A. C. SCINTA — 2,741,791
WINDSHIELD WIPER
Filed Oct. 14, 1952
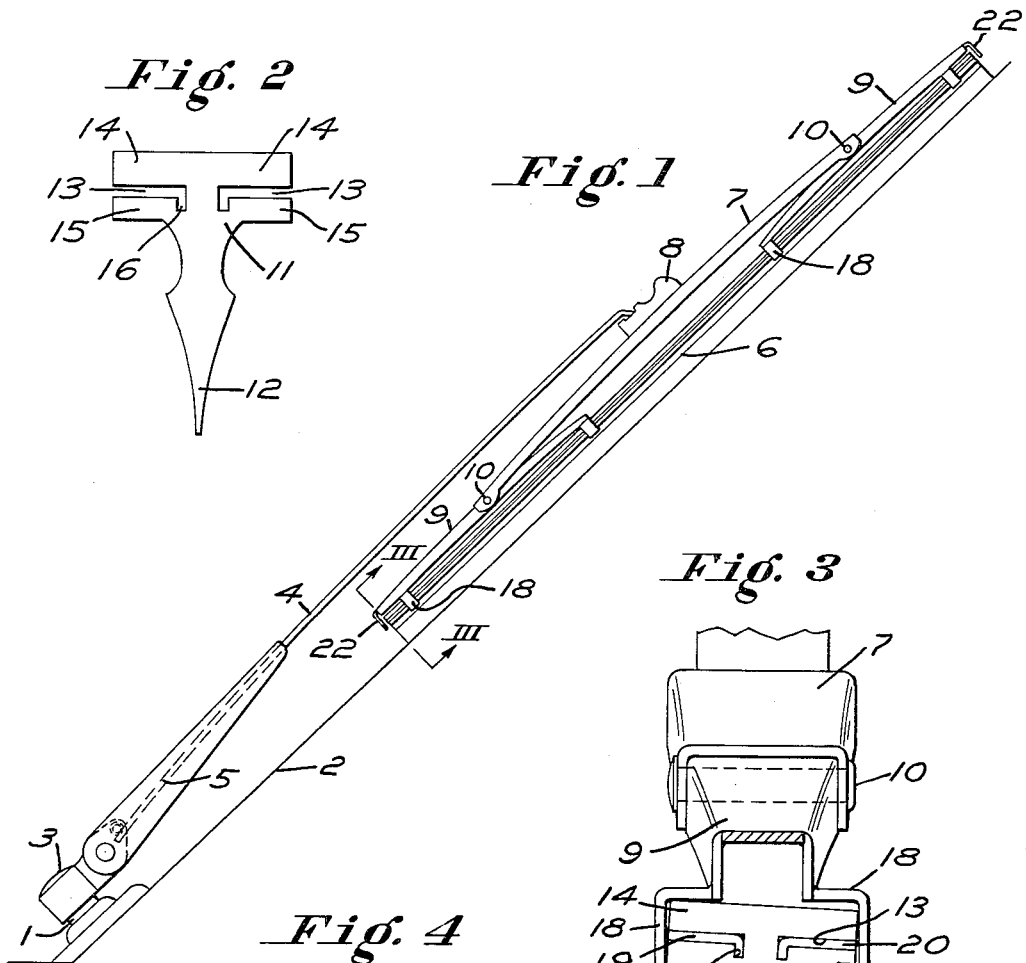
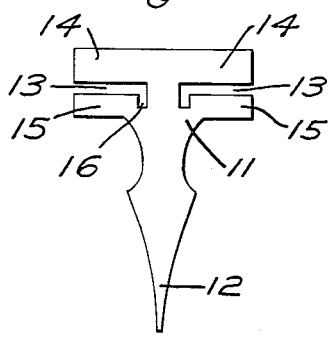
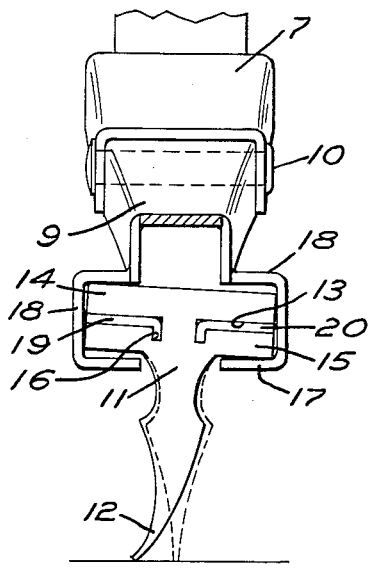
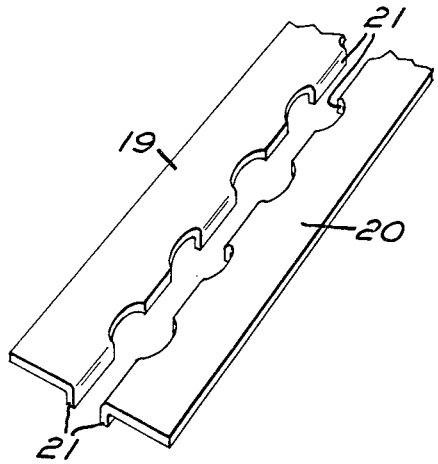
INVENTOR.
ANTHONY C. SCINTA
BY
Beau, Brooks, Buckley & Beau.
ATTORNEYS.

United States Patent Office 2,741,791
Patented Apr. 17, 1956

2,741,791
WINDSHIELD WIPER

Anthony C. Scinta, Buffalo, N. Y., assignor to Trico Products Corporation, Buffalo, N. Y.

Application October 14, 1952, Serial No. 314,625

13 Claims. (Cl. 15—245)

This invention relates generally to the windshield wiper art, and more particularly to a wiper adapted for cleaning curved windshield surfaces and embodying a flexible backing acting under the urge of an actuating arm to compel conformance of the wiping edge to a curved windshield surface.

A primary object of this invention is to provide a windshield wiper for curved windshields which is quiet and efficient in operation, and which incorporates means preventing accidental disengagement of the blade body from its holder means by reason of operational stresses.

Another object of this invention is to provide a wiper for curved windshields which presents a minimum area to the lifting action of wind currents about the windshield, thereby reducing the tendency of the wiper to lift away from the windshield surface and consequently fail in its wiping function.

A further object of this invention is to provide a wiper construction wherein the blade element is readily adapted for molding in accordance with modern methods.

It is also an object of this invention to provide a wiper which reduces to a minimum any interference with its wiping function by reason of the impact or jamming of snow and other such accumulations about its backing member.

Still another object of this invention is to provide a construction wherein the relatively fragile or distortable flexible backing, used to reinforce the rubber squeegee element, is protected.

A further object of this invention is to provide a wiper having the aforesaid characteristics which is relatively simple in construction and inexpensive to manufacture, and which is reliable and long-lasting in operation.

The foregoing and other objects will readily manifest themselves from the ensuing detailed description, taken together with the accompanying drawing wherein:

Fig. 1 is a view in side elevation of the improved wiper of this invention mounted on a windshield;

Fig. 2 is an enlarged view in end elevation of the squeegee element without its backing member;

Fig. 3 is a transverse sectional view taken along line III—III of Fig. 1, and showing the mode of operation of this wiper; and Fig. 4 is a fragmentary perspective view of the backing member.

Referring now to the drawing, wherein like reference numerals designate like parts throughout the various views, 1 denotes a wiper actuating shaft journaled adjacent the lower portion of windshield 2 and carrying an articulated wiper arm 3 having a hinged outer section 4 urged by a spring portion 5 to press a wiper carried by said arm against the windshield surface, all in a known manner.

The wiper unit is seen to comprise a blade or squeegee unit 6 and a pressure distributing holder member therefor in the nature of a supporting superstructure comprising a primary bridge or yoke 7 connected to said arm section 4 by a conventional attaching clip 8 and carrying at each end thereof a secondary yoke or bridge 9, which secondary bridges are pivotally connected intermediate their ends to bridge 7, as at 10, whereby said secondary bridges comprise rockers carried by said primary bridge.

The blade unit 6 comprises a blade body 11 provided with a laterally flexible wiping edge or lip 12 extending along one longitudinal margin and an enlarged upper backing portion therefor which portion is lengthwise chambered or recessed on opposite sides thereof as at 13. Blade 11 is formed of either natural or synthetic rubber, and by reason of its construction with slots 13 extending inwardly from opposite sides of the backing portion thereof and terminating short of the center line thereof, said blade is readily adapted to modern molding procedures.

With this construction, each of slots 13 is provided with or defined by an overhanging shoulder 14 and an underlying anchor rib or shoulder 15, and each of said anchor ribs 15 is recessed or cut away adjacent its inner terminal end to provide said slots with downturned terminal portions 16.

The enlarged backing portion of blade 11 is of relatively great lateral extent, whereby the anchor ribs 15 overhang the opposite sides of wiping lip 12. The undersides of anchor ribs 15 receive the straddling claw extensions 17 of the presser feet 18 that depend from adjacent the opposite ends of rockers 9. It will be noted that said presser feet 18 are positioned at the inner end of each of said rockers 9, and slightly inwardly from the outer end thereof, as clearly shown in Fig. 1. The presser feet 18 seat upon overhanging shoulders 14 under the spring urge imparted by the wiper arm, and are sufficiently larger than the backing portion of blade 11 to enable said blade to rock laterally a predetermined extent therein for assuming the proper dragging position in operation, as clearly illustrated in Fig. 3.

The flexible backing member of the instant invention is in the form of two separate spring strips 19 and 20 fitted in slots 13 and provided with retainer lugs 21 spaced at intervals along their adjacent longitudinal margins and turned downwardly at an angle thereto toward the wiping lip, said lugs engaging in the terminal portions 16 of slots 13 and interlocking with anchor ribs 15 for securing said backing strips and anchor ribs against accidental release. In addition, anchor ribs 15 are made heavy and substantial to withstand the lateral tug imposed by the wiping lip 12 as the blade sweeps across the windshield surface.

During the sweep of the blade in operation, the tendency is for the rubber blade body to roll about its flexible backing, and with the instant invention this tendency results in a downward pull upon the forward side of the blade looking in the direction of blade movement causing the forward anchor rib to bear downwardly on the claw extensions 17 and engage the lugs of its backing strip more firmly, with the rearward overhanging shoulder 14 bearing against the presser feet and down upon its backing strip, as clearly illustrated in Fig. 3, the opposite anchor rib and overhanging shoulder being caused to bear more firmly against their backing strips when the direction of wiper movement is reversed. In this way, the flexible backing strips reinforce the rubber blade body against the tendency to distort and disengage from the presser feet 18 as the blade performs its wiping function. The length of the retainer lugs, and the spacing thereof, is such as to retain the flexibility of the backing strips whereby the latter, under the urging of the arm spring, will compel conformance of the wiping lip to a curved windshield surface. At the same time, the metal backing strips afford lateral stability and support to the elongated flexible blade.

Therefore, it will be appreciated that in the instant invention the flexible backing performs a three-fold purpose in affording lateral support to the wiper blade, in compelling surface conformance of the wiper blade under a spring urge, and in reinforcing the blade body against disengagement from its holder members. At the same time, the flexible backing is encased in the rubber body, whereby it is protected from the weather and from accumulations tending to interfere with its operation, as well as from accidental damage thereto. Also by reason of the backing member being embedded in the rubber body the operational rolling contact between the wiper body and its holders is that of rubber to metal whereby operational noises are reduced to a minimum. In addition, accidental contact between the backing strips and the windshield surface is substantially precluded.

In assembling this wiper, the backing strips are simply inserted endwise through the open ends of slots 13 and the assembled blade unit is inserted endwise through the presser feet 18 of the rocker holder members. Said rockers 9 are provided with terminal projections 22 which are then downturned to hold the blade unit within the holder unit, as clearly shown in Fig. 1.

Therefore, it is clearly apparent that the instant invention has fully accomplished the aforesaid objects. While a preferred embodiment of this invention has been disclosed in detail herein, the invention is not necessarily limited thereto but encompasses various modifications thereof falling within the skill of the art. Accordingly, it is intended that this invention be limited and defined solely by the scope of the appended claims.

Having completely disclosed this invention and fully described its mode of operation, what is claimed as new is as follows:

1. A windshield wiper for curved glass comprising, an elongated blade body having a wiping lip along one longitudinal margin thereof and a backing portion along its opposite longitudinal margin, means defining laterally spaced slots extending lengthwise of said backing portion, and flexible backing members arranged in said slots for effecting conformance of said wiping lip to a curved surface while providing lateral support for said blade body, said backing members being provided along their inner margins with retainer means extending at an angle thereto toward said wiping lip and embedded in said blade body.

2. A windshield wiper for curved glass comprising, an elongated blade body having a wiping edge along one longitudinal margin and a backing portion along its opposite margin, means defining plural slots extending in spaced-apart side-by-side relation lengthwise of said backing portion, and flexible backing strips arranged in said slots, said backing strips having retainer lugs spaced along their adjacent margins and turned at an angle thereto toward said wiping lip and said slots having recessed wall formations receiving said lugs.

3. A windshield wiper for curved glass comprising, an elongated blade body having a wiping edge along one longitudinal margin thereof and an enlarged backing portion along its opposite margin, and laterally spaced flexible backing strip means embedded in said backing portion on opposite sides of the longitudinal centerline thereof and extending lengthwise thereof for effecting surface-conformance of said blade body and providing lateral support therefor, the adjacent margins of said laterally spaced backing strip means being formed to provide retainer means turned at an angle thereto toward said wiping edge and embedded in said blade body.

4. A windshield wiper for curved glass comprising, an elongated flexible blade body having a wiping edge along one longitudinal margin thereof and an enlarged backing portion along its opposite longitudinal margin, said backing portion being slotted to provide longitudinal recesses extending inwardly from opposite sides of said backing portion to adjacent the center thereof, and flexible backing members fitted in said recesses so as to be substantially completely encased within said backing portion, said backing members serving to effect surface-conformance of said wiping edge and to provide lateral support for said blade body.

5. A windshield wiper for curved glass comprising, an elongated flexible blade body having a wiping edge along one longitudinal margin thereof and an enlarged backing portion along its opposite longitudinal margin, said backing portion being slotted to provide longitudinal recesses extending inwardly from opposite sides of said backing portion to adjacent the center thereof, flexible backing members fitted in said recesses so as to be substantially completely encased within said backing portion, said backing members serving to effect surface-conformance of said wiping edge and to provide lateral support for said blade body, and holder means loosely embracing said backing portion for bearing thereagainst and transmitting wiping pressure thereto while enabling lateral rocking thereof without contacting said backing members.

6. A windshield wiper particularly adapted for curved windshields comprising, an elongated blade body having a wiping lip along one margin and an enlarged backing portion along its opposite margin, means defining laterally spaced recesses extending lengthwise of said backing portion on opposite sides of the center line thereof, laterally rigid flexible backing members within said recesses to effect surface-conformance of said wiping lip and to provide lateral support for said blade body, said backing members being provided with retainer lug means along their adjacent margins extending at an angle thereto toward said wiping lip and said recesses being provided with recessed wall formations receiving said retainer lug means, and a holder member loosely embracing said enlarged backing portion at spaced points therealong for bearing thereagainst while enabling a predetermined degree of lateral rocking of said blade body, said backing members also serving to reinforce said blade body against displacement from said holder member as a result of such lateral rocking.

7. A wiper particularly adapted for curved glass comprising, an elongated blade body having a wiping edge along one longitudinal margin thereof and an enlarged backing portion along its opposite margin, means defining laterally spaced slots extending lengthwise of said backing portion, elongated flexible backing members confined within said slots so as to be substantially completely encased within said blade body, and a holder unit for said blade body comprising a primary yoke member adapted for attachment to an actuating arm, secondary yoke members rockably mounted adjacent opposite ends of said primary yoke member, and presser feet means on said secondary yoke members extending around and under said backing portion to loosely embrace and bear against the same at spaced points therealong, whereby said blade body is laterally rockable within said holder unit.

8. A wiper particularly adapted for curved glass comprising, an elongated blade body having a wiping edge along one longitudinal margin thereof and an enlarged backing portion along its opposite margin, means defining laterally spaced slots extending lengthwise of said backing portion, elongated flexible backing members confined within said slots so as to be substantially completely encased within said blade body, and a pressure distributing holder unit for said blade body comprising a primary member adapted for attachment to an actuating arm, secondary members rockably mounted adjacent opposite ends of said primary member, and presser feet means on said secondary members extending around and under said backing portion to loosely embrace and bear against the same at spaced points therealong, whereby said blade body is laterally rockable within said holder unit, said primary member being of inverted channel shape for nestingly receiving said secondary members.

9. A wiper adapted for use with curved glass comprising an elongated blade body having a wiping lip along one longitudinal margin thereof and an enlarged backing portion along its opposite margin, said backing portion being slotted on opposite sides thereof to define inwardly extending recesses laterally spaced and extending lengthwise of said backing portion, elongated flexible backing strips of greater width than thickness fitted within said recesses and provided along their inner adjacent margins with retainer lug formations turned at an angle thereto and extending toward said wiping lip, said recesses having recessed wall formations receiving said lug formations, said backing members being substantially completely encased within said blade body backing portion, and a holder unit for said blade body comprising a primary bridge member arranged for attachment to a wiper arm, and secondary bridge members pivoted to opposite ends of said primary bridge members and loosely straddling said backing portion for bearing thereagainst while enabling lateral rocking of said blade body.

10. A windshield wiper particularly adapted for curved window surfaces comprising, an elongated blade body having a wiping surface along one margin thereof and an enlarged backing portion along its opposite margin, means defining laterally spaced slots extending lengthwise of said backing portion on opposite sides of the centerline thereof, flexible backing members fitted within in said slots to effect surface conformance of said wiping lip and to provide lateral support for said blade body, said members being provided with spaced lug means turned at an angle thereto along their adjacent margins and said slots being provided with recessed wall formations receiving said lug means, and holder means loosely embracing said enlarged backing portion at spaced points therealong for bearing thereagainst while enabling a predetermined degree of lateral rocking of said blade body, said backing members serving to reinforce said blade body against displacement from said holder means as a result of such lateral rocking and being substantially completely encased within said backing portion whereby they are protected and whereby to avoid contact thereof with said holder means.

11. A windshield wiper particularly adapted for curved window surfaces comprising, an elongated flexible blade body having a wiping edge along one margin thereof and an enlarged backing portion along its opposite margin, said backing portion being slotted to provide longitudinal recesses extending inwardly from opposite sides of said backing portion to adjacent the center thereof, and flexible backing members fitted in said recesses so as to be substantially completely encased within said backing portion, said backing members serving to effect surface conformance of said wiping edge and to provide lateral support for said blade body, retainer lugs spaced along the adjacent margins of said backing members and turned at an angle thereto, and recessed wall formations in said recesses for receiving said lugs.

12. A wiper particularly adapted for use with curved window glass comprising, an elongated blade body having a wiping edge along one longitudinal margin thereof and an enlarged backing portion along its opposite margin, said backing portion being slotted on opposite sides thereof to define inwardly extending recesses each terminating short of the center of said backing portion, and backing members fitted in said recesses so as to be substantially completely encased in said blade body backing portion, said backing members serving to effect surface conformance of said wiping lip while providing lateral support for said blade body.

13. A wiper particularly adapted for curved window surfaces comprising, an elongated blade body having a wiping edge along one longitudinal margin thereof and a backing portion along its opposite margin, and transversely generally flat elongated backing strip means substantially completely encased within said backing portion and extending lengthwise thereof in laterally spaced apart relation on opposite sides of the longitudinal centerline thereof, said backing strip means being laterally substantially rigid and being flexible in a direction to effect surface conformance of said wiping edge.

References Cited in the file of this patent

UNITED STATES PATENTS

| | | |
|---|---|---|
| 2,634,446 | Mackie et al. | Apr. 14, 1953 |
| 2,700,785 | Oishei et al. | Feb. 1, 1955 |

OTHER REFERENCES

Anderson Publication, November 1, 1946, The Anderson Co., Gary, Indiana, pages 1 and 2.